US012754807B2

(12) United States Patent
Malkevich et al.

(10) Patent No.: US 12,754,807 B2
(45) Date of Patent: Oct. 6, 2026

(54) MANAGEMENT OF PRODUCTION VOLUME RESTORE OVER REMOTE REPLICATION

(71) Applicant: Dell Products L.P., Round Rock, TX (US)

(72) Inventors: Evgeny Malkevich, Newton, MA (US); Arieh Don, Newton, MA (US)

(73) Assignee: Dell Product L.P., Round Rock, TX (US)

( * ) Notice: Subject to any disclaimer, the term of this patent is extended or adjusted under 35 U.S.C. 154(b) by 19 days.

(21) Appl. No.: 18/919,554

(22) Filed: Oct. 18, 2024

(65) Prior Publication Data

US 2026/0111319 A1 Apr. 23, 2026

(51) Int. Cl.
*G06F 11/14* (2026.01)
*G06F 11/1446* (2026.01)

(52) U.S. Cl.
CPC ...... *G06F 11/1469* (2013.01); *G06F 11/1451* (2013.01)

(58) Field of Classification Search
CPC ... G06F 11/14; G06F 11/1469; G06F 11/1451
See application file for complete search history.

(56) References Cited

U.S. PATENT DOCUMENTS

| | | | | |
|---|---|---|---|---|
| 7,529,782 | B2 * | 5/2009 | Prahlad | G06F 16/178 |
| 10,691,370 | B2 * | 6/2020 | Killamsetti | G06F 3/067 |
| 2016/0034481 | A1 * | 2/2016 | Kumarasamy | G06F 16/128 707/639 |
| 2017/0295239 | A1 * | 10/2017 | Fang | G06F 3/0619 |
| 2020/0057564 | A1 * | 2/2020 | Killamsetti | G06F 3/0653 |
| 2020/0310915 | A1 * | 10/2020 | Alluboyina | G06F 11/1469 |
| 2022/0318097 | A1 * | 10/2022 | Quan | G06F 3/0644 |

* cited by examiner

*Primary Examiner* — Kamini B Patel
(74) *Attorney, Agent, or Firm* — Daly, Crowley, Mofford & Durkee, LLP

(57) ABSTRACT

Management of production volume restore over remote replication is provided for a production volume of a storage system. The production volume is associated with an object identifier and a first snapshot identifier. Over time, a plurality of snapshots of the first production volume are generated. Generating each snapshot includes associating the snapshot with an incremented object identifier, associating the snapshot with the first snapshot identifier, and updating the first snapshot identifier with the incremented object identifier. One of the plurality of snapshots with which to restore the production volume is identified based on the first snapshot identifier. The production volume is restored using the identified one of the plurality of snapshots.

20 Claims, 7 Drawing Sheets

201

| Vol | O_ID | Snap_ID |
|---|---|---|
| *Production Vol* | *1* | *X* |
| *Snap_1* | *2* | *Y* |
| . . . | ... | ... |
| *Snap_n* | *n+1* | *Z* |

| Vol | O_ID | Snap_ID |
|---|---|---|
| Production Vol | 1 | 5 |
| Snap_1 | 2 | 1 |
| Snap_2 | 3 | 2 |
| ~~Snap_3~~ | ~~4~~ | ~~2~~ |
| Snap_2-1 | 5 | 3 |

(a)

| Vol | O_ID | Snap_ID |
|---|---|---|
| Production Vol | 1 | 5 |
| Snap_1 | 2 | 1 |
| ~~Snap_2~~ | ~~3~~ | ~~2~~ |
| Snap_2-1 | 5 | 3 |

(b)

| Vol | O_ID | Snap_ID |
|---|---|---|
| Production Vol | 1 | 5 |
| Snap_1 | 2 | 1 |
| Snap_2-1 | 5 | ~~3~~ -> 2 |

(c)

FIG. 7

MANAGEMENT OF PRODUCTION VOLUME RESTORE OVER REMOTE REPLICATION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

To provide redundancy and backup of critical data in distributed storage systems, production volumes of data may be periodically cloned and/or imaged (e.g., in one or more snapshots) in case the production volume or its data become damaged, unavailable, or otherwise compromised. Snapshots or clones may include full copies of the data on the volume or may only include differences between the production volume and the most-recent back-up. Given the criticality of the data and the applications involved, clones and snapshots may be generated on very small periods, which as time passes, creates a large number of backups occupying a large amount of storage. Additionally, at times, one or more of the backups may be corrupted, requiring identification of and restoration from another (e.g., older) suitable snapshot.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of management of production volume restore over remote replication is provided for a production volume of a storage system. The production volume may be associated with an object identifier and a first snapshot identifier. Over time, a plurality of snapshots of the first production volume may be generated. Generating each snapshot may include associating the snapshot with an incremented object identifier, associating the snapshot with the first snapshot identifier, and updating the first snapshot identifier with the incremented object identifier. One of the plurality of snapshots with which to restore the production volume may be identified based on the first snapshot identifier. The production volume may be restored using the identified one of the plurality of snapshots.

The method may include, alone or in combination one or more of the following features. The first snapshot identifier may be updated with the incremented object identifier of the identified one of the plurality of snapshots. A second snapshot of one of the plurality of snapshots may be generated. The second snapshot may be associated with a next incremented object identifier and associated with the incremented object identifier of the one of the plurality of snapshots. The production volume may be restored using the second snapshot and updating the first snapshot identifier with the next incremented object identifier of the second snapshot. The plurality of snapshots may be point-in-time copies of the production volume. The plurality of snapshots may be clones of the production volume. The first snapshot identifier may identify a closest snapshot that most nearly resembles the production volume.

A system for management of production volume restore over remote replication is provided for a production volume of a storage system. The system may include a memory and at least one processor that is operatively coupled to the memory. The at least one processor being configured to perform the operations of providing a production volume of a storage system. The production volume may be associated with an object identifier and a first snapshot identifier. Over time, a plurality of snapshots of the first production volume may be generated. Generating each snapshot may include associating the snapshot with an incremented object identifier, associating the snapshot with the first snapshot identifier, and updating the first snapshot identifier with the incremented object identifier. One of the plurality of snapshots with which to restore the production volume may be identified based on the first snapshot identifier. The production volume may be restored using the identified one of the plurality of snapshots.

The system may include, alone or in combination one or more of the following features. The first snapshot identifier may be updated with the incremented object identifier of the identified one of the plurality of snapshots. A second snapshot of one of the plurality of snapshots may be generated. The second snapshot may be associated with a next incremented object identifier and associated with the incremented object identifier of the one of the plurality of snapshots. The production volume may be restored using the second snapshot and updating the first snapshot identifier with the next incremented object identifier of the second snapshot. The plurality of snapshots may be point-in-time copies of the production volume. The plurality of snapshots may be clones of the production volume. The first snapshot identifier may identify a closest snapshot that most nearly resembles the production volume.

According to another aspect, a non-transitory computer-readable medium may store one or more processor-executable instructions, which, when executed by at least one processor, cause the at least one processor to perform the operations of providing a production volume of a storage system. The production volume may be associated with an object identifier and a first snapshot identifier. Over time, a plurality of snapshots of the first production volume may be generated. Generating each snapshot may include associating the snapshot with an incremented object identifier, associating the snapshot with the first snapshot identifier, and updating the first snapshot identifier with the incremented object identifier. One of the plurality of snapshots with which to restore the production volume may be identified based on the first snapshot identifier. The production volume may be restored using the identified one of the plurality of snapshots.

The non-transitory computer-readable medium may further include, alone or in combination, instructions which when executed perform one or more of the following features. The first snapshot identifier may be updated with the incremented object identifier of the identified one of the plurality of snapshots. A second snapshot of one of the plurality of snapshots may be generated. The second snapshot may be associated with a next incremented object identifier and associated with the incremented object identifier of the one of the plurality of snapshots. The production volume may be restored using the second snapshot and updating the first snapshot identifier with the next incremented object identifier of the second snapshot. The plurality of snapshots may be point-in-time copies of the production volume. The plurality of snapshots may be clones of the production volume.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 7 is a sequence of volume-snapshot tables reflecting delete operations, according to one or more aspects of the present disclosure.

DETAILED DESCRIPTION

Aspects of the present disclosure provide methods, systems, and computer-readable media for managing clones, snapshots or other duplications of data volumes for rollback, restoration, or other data transfer operations. The concepts, techniques and methods described herein may allow for a storage system to identify, in a sequence or series of volume copies, a copy closest in data to the production volume. Identification of the closest copy (i.e., a copy that most nearly resembles the data in the production volume) may allow the system to quicken the calculations and identification of the differences between the production volume and a copy such that corrupted, unavailable or otherwise compromised data can be efficiently restored.

Figure 1A:
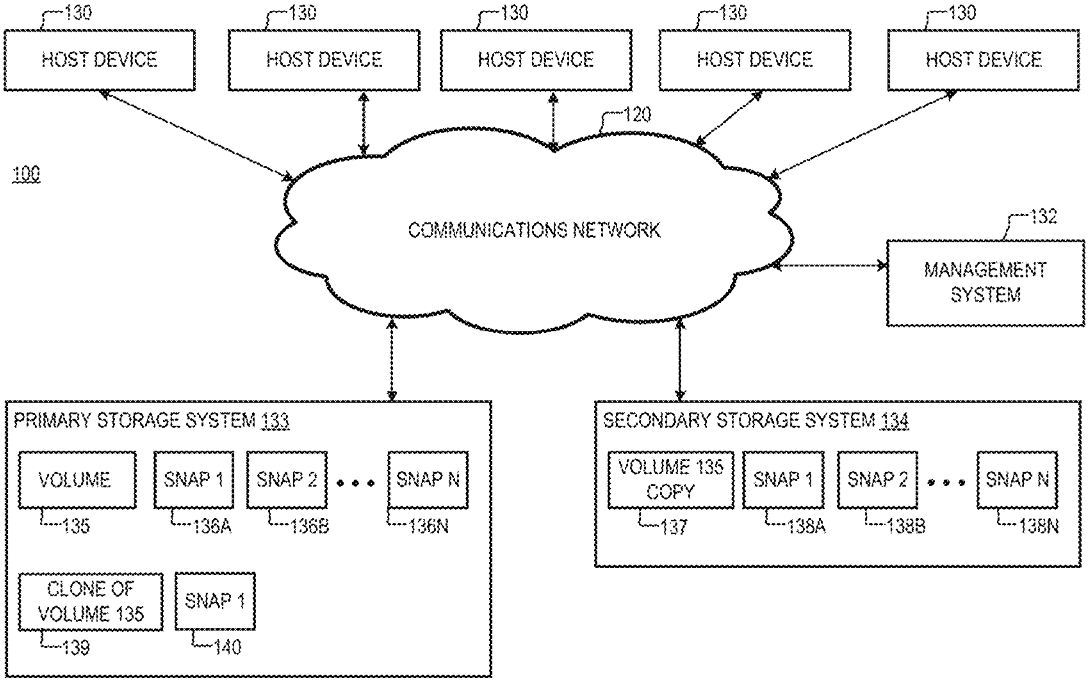
FIG. 1A is a diagram of an example of a storage system, according to one or more aspects of the present disclosure.

FIG. 1A is a diagram of an example of a system 100, according to aspects of the disclosure. As illustrated, system 100 may include a primary storage system 133 and a secondary storage system 134 that are coupled to a plurality of host devices 130 and a management system 132 via a communications network 120. Each of the primary storage system 133 and the secondary storage system 134 may be the same or similar to the storage system 200, which is discussed further below with respect to FIG. 1B. Each of the host devices 130 may be the same or similar to the computing device 800, which is discussed further below with respect to FIG. 8. The communications network 120 may include one or more of the Internet, a local area network (LAN), a wide area network (WAN), an InfiniBand network, a mobile data network, etc. Management system 132 may include a computing system that is used to manage storage systems 133 and 134. Management system 132 may include one or more computing devices, such as the computing device 800, which is discussed further below with respect to FIG. 8.

The primary storage system 133 may be configured to implement and/or host a volume 135. In addition, the primary storage system 133 may be configured to create snapshots 136A-N of volume 135 at predetermined time intervals. According to one aspect as described herein, a snapshot of a volume, such as any of snapshots 136A-N, 138A-N, and 140, may be a point-in-time copy of a storage volume or disk at a specific moment. A snapshot may capture the entire state of the volume, including all files, folders, and metadata, allowing for quick recovery in case of data loss or corruption. Volume snapshots may be commonly used in data backup and disaster recovery strategies to ensure data integrity and availability. Snapshots may enable users to restore the volume to its previous state or retrieve specific files or data from the snapshot without affecting the original volume.

According to one aspect, a snapshot of a volume may be either a full copy of a volume or a delta copy of the volume. When the snapshot is a full copy of the volume, the snapshot may contain all data that is present in the volume, and it may be the same or similar in size as the volume. A delta copy, or abbreviated snapshot, may be a snapshot reflecting only the changes from one snapshot to another. For example, if a first snapshot of a volume is created at time $t_1$ and a second snapshot of the volume is created at time $t_2$, an abbreviated snapshot may correspond to the difference between the first snapshot and the second snapshot, including (or identifying) all data that was deleted from the volume in the period $t_1$-$t_2$ as well as all data that was written to the volume in the period $t_1$-$t_2$. The abbreviated snapshot, in other words, may be regarded as a delta-copy snapshot of the volume in the sense that it identifies the incremental changes to the volume that occurred in the period t1-t2. The delta copy of a volume is also referred to as an "incremental snapshot" by those of ordinary skill in the art.

As used herein, a snapshot of a volume may represent the state of the volume when the snapshot was created, irrespective of whether the snapshot is a full copy or a delta copy of the volume. When the snapshot is a full-copy snapshot, the snapshot alone may represent the state of the volume. When the snapshot is a delta-copy snapshot, the snapshot may represent the state of the volume when combined with other snapshots that belong in the same snapshot tree. In general, the use of delta-copy snapshots (and incremental backup) is well understood by those of ordinary skill in the art.

The primary storage system 133 may be further configured to store a clone 139 of volume 135 and at least one snapshot of the clone 139. The secondary storage system 134 may be configured to implement and/or host a point-in-time copy 137 of volume 135. In addition, the secondary storage system 134 may be configured to store snapshots 138A-N of volume copy 137. Copy 137 of volume 135 may be a volume itself. As described herein, copy 137 may also be referred to as "volume 137". According to one aspect, volume 135 may be used for production, and volume 137 may be used for redundancy or backup. However, the present disclosure is not limited thereto.

According to one aspect, volume 135 may be a database and each of the host devices 130 may be a server that is running a frontend for the database. In operation, each of the host devices 130 may be configured to execute database queries by retrieving and/or storing data in volume 135. However, it will be understood that the present disclosure is not limited to any specific implementation and/or use of volume 135 or host devices 130.

According to one aspect, the snapshots of volumes 135 and 137 may be interchangeable to a degree. This because volume 137 is a copy of volume 135. For example, snapshot 138B may be used to revert volume 135 to an earlier state in the same way one would use snapshot 135B. Moreover, when volume 137 lags behind the current state of volume 135, the states of volume 135 and 137 may be synchronized by updating volume 137 based on a snapshot of volume 135 that represents the current state of volume 135.

The snapshots of a volume may be given different sequence numbers or identifiers. As described herein, an object identifier (O_ID, FIG. 2) may be assigned to each snapshot in a series or sequence. The object identifier may help manage and track the chronological order of snapshots taken over time. When snapshots are created, they may be assigned object identifiers to indicate their relative position in the sequence. This allows users or systems to easily identify and reference specific snapshots, particularly when managing multiple snapshots of the same volume or dataset. As detailed below, the object identifiers may be used for snapshot management tasks such as restoring data to a specific point in time or state, tracking changes over time, or implementing retention policies. According to aspects of the present disclosure, object identifiers may provide a clear way to organize and manage snapshots within a storage system or backup solution.

According to one or more aspects, a volume clone, such as the clone 139, may be a copy of an existing volume or disk that shares the same data as the original volume but is independent of it. Unlike traditional copies, which duplicate all data, a volume clone may utilize a copy-on-write or similar technology to create a copy that initially shares data blocks with the original volume. According to one aspect, a volume clone may allow the changes made to the original volume to be tracked separately on the clone. This means that, after the clone is created, modifications to the original volume may not affect the clone, and vice versa. Volume clones may be used for tasks such as testing software updates, database maintenance, performing experiments, or creating development environments without impacting the original data. Clones may provide a way to work with data without risking changes to the original source.

According to one aspect, clone 139 may be a clone of volume 135 and used to perform maintenance operations (e.g., repairing data) while incoming user requests are served out of volume 135. After the data is repaired, the contents of clone 139 may be written to volume 135. Writing the contents of clone 139 to volume 135 may cause volume 135 to store the same data as clone 139 (e.g., repaired data). In one aspect, the contents of clone 139 may be written to volume 135 by updating volume 135 based on the snapshot 140 of the clone 139. Snapshot 140 (alone or in combination with other snapshots of clone 139) may identify the changes that were made to clone 139 since the time it was identical to volume 135.

Figure 1B:
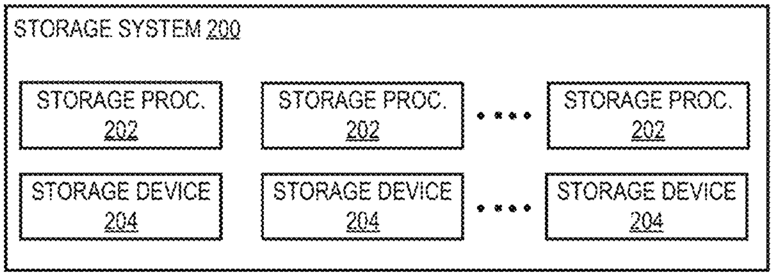
FIG. 1B is a diagram of an example of a storage system, according to one or more aspects of the present disclosure.

FIG. 1B is a diagram of an example of a storage system 200, according to aspects of the disclosure. The storage system 200 may be the same or similar to the primary storage system 133 and/or the secondary storage system 134 which is discussed above with respect to FIG. 1A. The storage system 200 may include a storage system, such as DELL/EMC Powermax™, DELL PowerStore™, and/or any other suitable type of storage system. The storage system 200 may include or be arranged with one or more site-pairs and a plurality of non-volatile memory storage devices 204. Each site may be or include, as described herein, a virtual provider. Each site of the site pairs may include one or more storage processors 202. Each of the storage processors 202 may be configured to receive I/O requests from host devices (FIG. 1A, 130) and execute the received I/O requests by reading and/or writing data to storage devices 114. Each of the host devices 130 may include a desktop computer, a laptop, a smartphone, an internet-of-things (IoT) device, and/or any other suitable type of computing device.

According to one aspect, each of storage devices 204 may be a non-volatile memory express (NVMe) drive. In another aspect, the storage devices may be solid-state drives (SSD). In some implementations, each of the storage devices 204 may be connected to the storage processors 202 via a Peripheral Component Interconnect Express (PCIe) connection. Each of the storage devices 204 may include a respective controller (not shown) and storage medium (not shown). The controller of each storage device 204 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 204 may be internal to one of the storage processors 202 and coupled to the storage processor via an M.2 slot that is provided on the motherboard of that storage processor. Additionally, or alternatively, in some implementations, any of the storage devices 204 may be part of a disk array enclosure (DAE) and coupled to each of the storage processors 202 via a respective InfiniBand adapter of that storage processor. It will be understood that the present disclosure is not limited to any specific method for connecting storage devices 202 to storage processors 204.

According to one aspect, when a production volume is in need of repair or restoration, a snapshot may be used to rebuild the production volume device. However, the production volume is ever-changing and thus may be include different data from any previously obtained snapshot. Further, given the dynamic nature of the storage systems, a "most-recent" snapshot may not always be the closest to the production volume, and in some circumstances, older snapshots may be identified as the selected volume to which the production volume should be restored. To allow for an efficient restore (e.g., less data to restore), aspects of the present disclosure provide a system and method to determine the closes snapshot to the production device, allowing the storage system to restore data on all volumes using remote replication and thereby reducing overall communication costs.

Figures 2, 3:
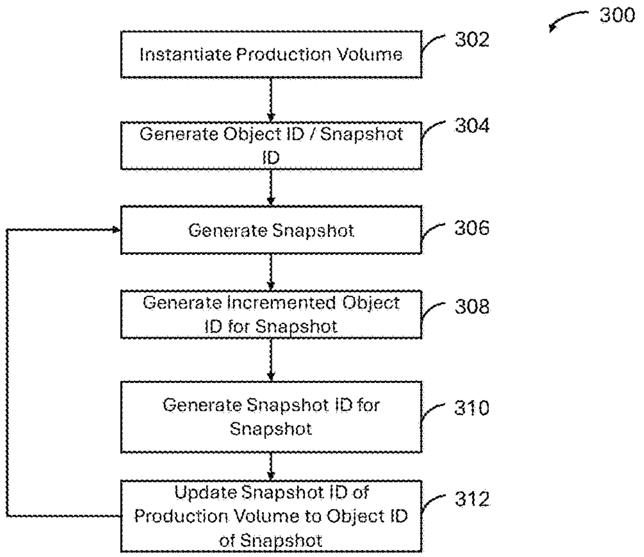
FIG. 2 is an example volume-snapshot table, according to one or more aspects of the present disclosure.
FIG. 3 is a flow diagram of a snapshot operation, according to one or more aspects of the present disclosure.

FIG. 2 shows an exemplary volume-snapshot table 201 that may be used to track and identify a snapshot that is closest to the production volume. As used herein, the terms "closest" or "nearest" may be used to indicate a snapshot, clone or other storage volume that most resembles the production volume data, i.e., includes the fewest differences between the snapshot data and the production volume data. The table 201, or another suitable data structure, may maintain and/or track variables used to identify the snapshot volume closest to the production volume.

The table 201 reflects an identification of the one or more volumes generated (Vol), including a production volume and a number of snapshots taken of the production volume, e.g., Snap_1, Snap_2 . . . Snap_n). For each of these volumes, an object identifier (O_ID) and a snapshot identifier (Snap_ID) may be generated. According to one aspect, the object identifier may be an ever-increasing sequential number (increasing in increments of i). The object identifier may increase with every version of the data, or snapshot, and may be unique. The object identifier may allow the storage system to distinguish between two different versions (e.g. snapshots) of the data, for example, which snapshot is newer.

The snapshot identifier may reflect the object identifier of the closest snapshot to that volume. For example, when a restore operation occurs, the snapshot identifier of the production volume may be associated with the object identifier of the snapshot from which it was restored. When a new snapshot is created from the production volume, the new snapshot becomes the closest snapshot to the production volume and the snapshot identifier of the production volume is updated to reflect the object identifier of the most recent snapshot. As detailed below with respect to FIGS. 6-7, the snapshot identifiers shown in FIG. 2, for example Snap_IDs X, Y, Z for each of the storage volumes Production Vol, Snap_1, . . . Snap_n may be or reflect one of the object identifiers, for example, O_IDs 1, 2, n+1).

FIG. 3 is a flow diagram of a snapshot operation 300 according to one or more aspects of the disclosure. The operation may begin with the instantiation of a production volume, shown in block 302. As shown in block 304, an object identifier and a snapshot identifier may be generated for the production volume. According to one aspect, and further detailed below, both the object identifier and snapshot identifier may be set at '1'. Shown in block 306, a snapshot may be generated of the production volume. The snapshot may be a point-in-time copy of the production volume. The snapshot may be generated according to a backup policy that generates snapshots periodically, according to a triggering event, or the like. An incremented object identifier may be generated and associated with the snapshot, as shown in block 308. The incremented snapshot identifier will be incremented from the either the production volume, if a first snapshot, or the object identifier of the previous snapshot. As shown in block 310, a snapshot identifier may be generated and associated with the snapshot. According to one aspect, the snapshot identifier may reflect the object identifier of the volume that was closest to the production volume prior to the generation of the new snapshot. As shown in block 312, the snapshot identifier of the production volume may be updated to object identifier of the new snapshot. Accordingly, the production volume is now associated with the snapshot that most closely resembles the production volume.

According to one aspect, subsequent snapshots may be generated (e.g., returning to block 306) according to a backup policy, including periodic backups, event-triggered backups, or the like. Each subsequent snapshot may be associated with an incremented object identifier and its own snapshot identifier reflecting the object identifier of the closest volume (either the production volume or one of the previously generated snapshots) to the new snapshot. According to one aspect, the generation of the snapshot, shown in block 306, may include generating a snapshot of a snapshot. For example, if a first snapshot is made visible (or otherwise available) to a host and the host writes to the first snapshot, a second snapshot may be generated reflecting the changes from the first snapshot. Snapshots of snapshots may also be associated with incremented object identifiers and snapshot identifiers similarly to snapshots of the production volume, as described herein.

Figure 4:
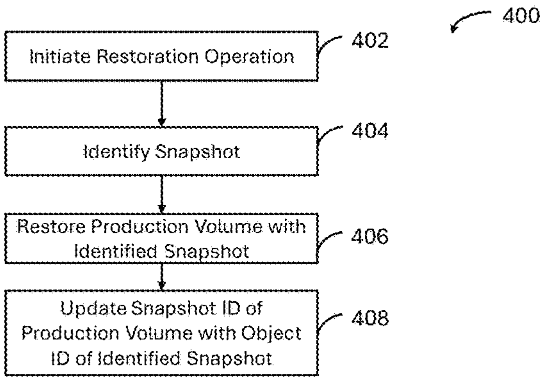
FIG. 4 is a flow diagram of a volume restore operation, according to one or more aspects of the present disclosure.

When a restoration operation is needed, the storage system may identify the snapshot to use in restoring the production volume by querying or otherwise obtaining the snapshot identifier of the closest snapshot. FIG. 4 is a flow diagram of a restoration operation 400, according to aspects of the present disclosure. As shown in block 402, a restoration operation may be initiated. The operation may be initiated in response to a failure, corruption, or other circumstance in which the production volume data is no longer available or reliable. As shown in block 404, the system may need to identify among one or more stored snapshots the appropriate snapshot to use to restore the production volume using remote replication. According to one aspect, the system may be configured to identify a snapshot with which to restore the production volume. According to one aspect, the identified snapshot may be the most recent snapshot, or it may be another snapshot that is closest in data but may not be in time. Alternatively, the system may be able to restore the production volume from any one of the snapshots.

As shown in block 406, the production volume may be restored using the identified snapshot. Remote replication may be used to return the production volume to the data, or state, when the identified snapshot was generated. As shown in block 408, after the restoration of the production volume the snapshot identifier of the production volume may be updated with, or to reflect, the object identifier of the snapshot that was used in the restoration operation.

Figure 5:
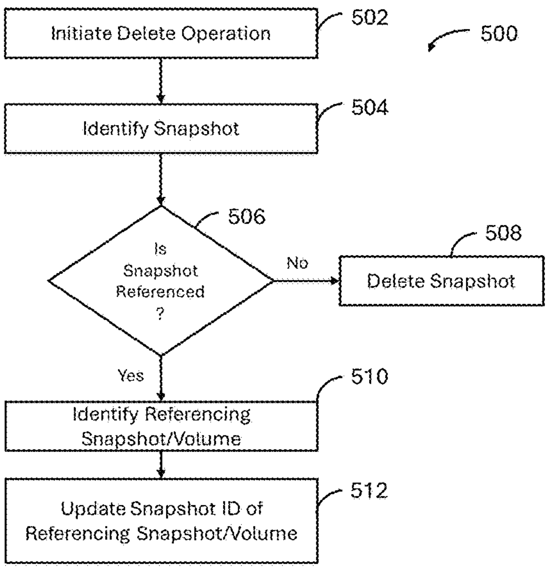
FIG. 5 is a flow diagram of a snapshot delete operation, according to one or more aspects of the present disclosure.

Turning now to FIG. 5, a flow diagram of a snapshot delete operation 500 is shown. It may be desirable to delete snapshots that may be stale, too old, or otherwise identified as not needed. Before the snapshot may be deleted or removed from the system, however, it must be determined if any of the other volumes (both the production volume and snapshots) are currently referencing the snapshot to be deleted, either by the object identifier or the snapshot identifier. For example, if the production volume has a snapshot identifier reflecting the object identifier of the snapshot to be deleted, the system may not be able to delete the snapshot until the snapshot identifier of the production volume is updated to reflect another snapshot. Otherwise, the system would be left without an indication of which snapshot is currently closest to the production volume and may disrupt or prevent backup operations.

As shown in block 502 the system may determine that one or more snapshots are to be deleted, and a delete operation is initiated. The system may, as shown in block 504, may identify the snapshot to be deleted. The system may consider whether the snapshot is referenced by the production volume or any other snapshot, shown in block 506. That is, the system may determine whether the object identifier of the snapshot to be deleted is reflected in any of the snapshot identifiers of the other snapshots or the production volume. If the identified snapshot to be deleted is not referenced by another volume (i.e., no other snapshot identifier among all snapshots reflects the object identifier of the snapshot to be deleted), the snapshot may be deleted without further processing, shown in block 508. If, however, the snapshot to be deleted is referenced by either the production volume or another snapshot (e.g., in the case of taking a snapshot of a snapshot, described below) the snapshot identifiers referencing the object identifier of the snapshot to be deleted may need to be updated to ensure continuity. As shown in block 510, the system may identify the snapshots referencing object identifier of the snapshot to be deleted. Shown in block 512, the snapshot identifiers of the snapshots referencing the snapshot to be deleted maybe updated to reflect the object identifier of the snapshot closest to the snapshot to be deleted. According to one aspect, this may be the snapshot identifier of the snapshot to be deleted.

Figure 6:
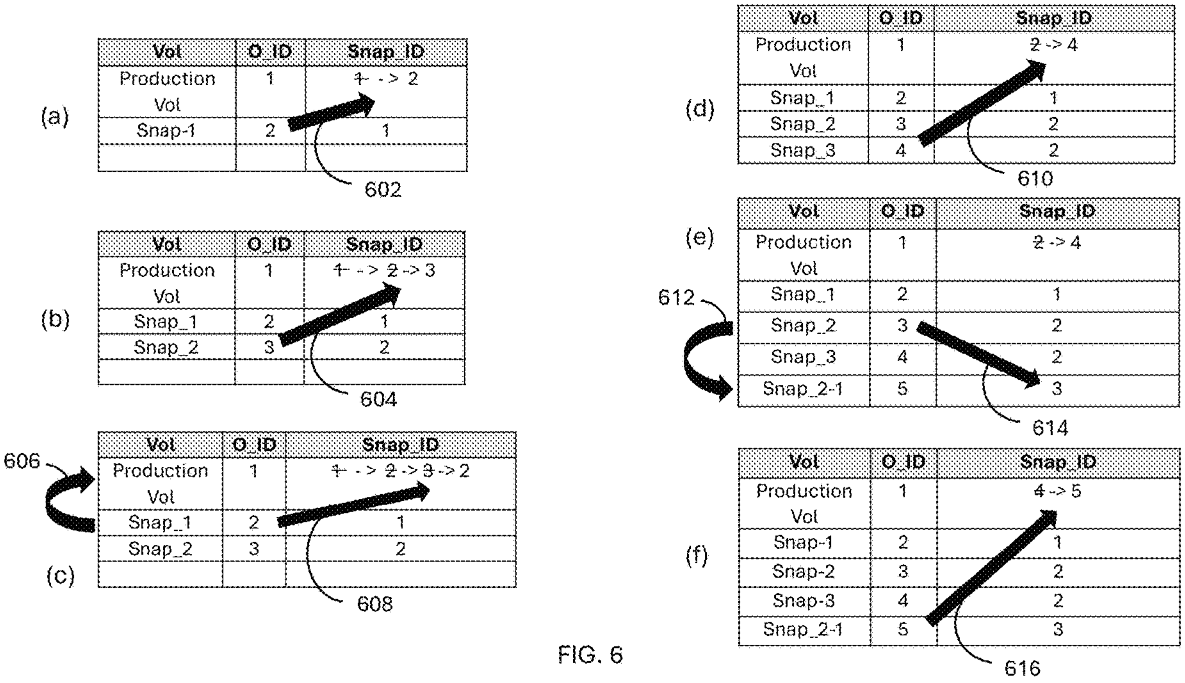
FIG. 6 is a sequence of volume-snapshot tables reflecting snapshot and restore operations, according to one or more aspects of the present disclosure.

Turning now to FIGS. 6-7, the above concepts, techniques and methodologies may be exemplified in a series of operations shown in the tables (a)-(f) of FIG. 6 and tables (a)-(c) of FIG. 7. One skilled in the art will appreciate that the number, sequence and result of the operations described in connection with the tables of FIGS. 6-7 are merely examples and should not be construed as limiting. One of skill in the art will further appreciate that the operations described herein may be scaled to reflect any number of snapshots, volumes, and operations storage systems within a complex storage environment.

Beginning with the table (a) of FIG. 6, a volume-snapshot table reflects the creation of a first snapshot (Snap_1) of a production volume (Production Vol). When the production volume was instantiated, or otherwise created, Production Vol may be assigned an objected identifier (O_ID) of '1' and a snapshot identifier (Snap_ID) of '1'. The Snap_ID of '1' may indicate that the volume having an O_ID of '1' represents the volume that is closest to the production volume. In this example, at the instantiation of Production Vol, there may be no snapshots, so the Snap_ID refers to itself.

Upon the generation of Snap_1, the first snapshot may be assigned or associated with an incremented O_ID of '2', as it is the next volume created after 0_ID '1'. Snap_1 may further be associated with a Snap_ID of '1' indicating that Snap_1 is closest in data to the volume with an O_ID of '1', e.g., Production Vol. Further, now that Snap_1 has been generated from the production volume, the Snap_ID of Production Vol is updated to '2' (e.g., ~~1~~ →2), shown by arrow 602. This indicates that Production Vol is now closest to (i.e., most similar in data) to the volume with the O_ID of '2', namely Snap_1. If the system needs to restore the production volume to a previous, closest state, the system may consult the Snap_ID associated with Production Vol and determine that Snap_1 is the volume with which to restore the production volume.

According to one aspect, when a subsequent snapshot is generated, for example Snap_2, shown in table (b), the new snapshot may be given an incremented O_ID of '3'. Snap_2 may also be associated with a Snap_ID of '2', reflecting the current Snap_ID associated with the production volume, the volume closest in data to Production Vol. As shown by arrow 604, the Snap_ID of Production Vol may then be updated to the O_ID of Snap_2 (e.g., ~~1~~ → ~~2~~ →3) because the production volume is now slowest in data to Snap_2.

According to one aspect, in an exemplary operation, a restore operation may be initiated in which the production volume is to be restored from Snap_1. The restore operation is reflected in table (c), arrow 606. While Snap_2 may be the closest snapshot to the production volume, there may be a reason to roll back the production volume to an earlier snapshot, for example if Snap_2 is found to be corrupted or otherwise unsuitable. Accordingly, when Snap_1 is used to restore the Production Vol, the Snap_ID of Production Vol is updated from '3' to '2', shown by arrow 608 because Snap_1, the restoring volume, has an O_ID of '2'. Here, the production volume is now closest in data to Snap_1, as identified by Snap_1's O_ID.

Table (d) of FIG. 6 reflects the generation of a new snapshot, Snap_4. Snap_4 may be given an incremented O_ID of '4' and a Snap_ID of '2', the Snap_ID of Production Vol. The Snap_ID of the production volume may be updated, shown by arrow 610, from '2' to '4' to reflect the O_ID of the new snapshot, which is now the closest snapshot to the production volume.

According to one or more aspects, the concepts, techniques, and methodologies described herein may be extended to snapshots generated from other snapshots. For example, if a given snapshot is made visible to a host and the host writes to the snapshot, a new snapshot of the visible snapshot may be generated. Table (e) reflects one such example operation in which a new snapshot (Snap_2-1) may be generated from Snap_2, shown by arrow 612. Snap_2-1 may be given an incremented O_ID, in sequence with the other snapshots, e.g. O_ID '5'. The Snap_ID of Snap_2-1 may be associated with the O_ID of the snapshot from which it was created, e.g., Snap_2, O_ID '3', shown by arrow 614.

According to one aspect, a restore operation, reflected in table (f), may restore the production volume from Snap_2-1. Accordingly, shown by arrow 616, the Snap_ID of Production Vol may be updated to '5' reflecting the O_ID of Snap_2-1. After the restoration, the production volume may be closest in data to the snapshot Snap_2-1.

According to another aspect, reflected in tables (a)-(c) of FIG. 7, the maintenance of several snapshots may be disadvantageous, due to storage capacity or other concerns, and it may be desirable for the system to remove or delete one or more snapshots from its memory. However, given the interrelations between the various snapshots, as described herein, consideration may be made to the object identifiers and snapshot identifiers of the volumes to ensure that when a snapshot is deleted, continuity between the remaining volumes is preserved.

For example, as reflected in table (a) of FIG. 7, Snap_3 may be identified for deletion. Here, Snap_3 has an O_ID of '4' and a Snap_ID of '2'. Because no other volume listed in table (a) references O_ID '4', Snap_3 may be deleted without issue or additional operations. In table (b), however, should the system identify Snap_2 for deletion, additional operations may be necessary. In the example of table (b), Snap_2 has an O_ID of '3' and a Snap_ID of '2'. Snap_2 may not be deleted without further consideration, however, because the Snap_ID of Snap_2-1 references O_ID '3'. Simply deleting Snap_2 may result in a discontinuity of the snapshots. To ensure continuity, as shown in table (c), the Snap_ID of the volume referencing the volume to be deleted, Snap_2-1, may be updated to the Snap_ID of Snap_2. Accordingly, the Snap_ID of Snap_2-1 is updated to '2' which was the Snap_ID of the volume to be deleted, in this case Snap_2. After the deletion of Snap_2, the volume closest in data to Snap_2-1, is now Snap_1, which has the O_ID of '2'. Similarly, if a snapshot that is referenced by the production volume is deleted (for example, Snap_2-1), the Snap_ID of the production volume may be updated to reflect the Snap_ID of the volume to be deleted. In this example, if Snap_2-1 were to be deleted, the Snap_ID of the production volume may be updated to '2', which is the Snap_ID of ASnap_2–1.

While the exemplary aspects of the present disclosure focus on the generation, tracking, restoration and maintenance of point-in-time snapshots, one skilled in the art will recognize that the disclosure is not limited only to such snapshots. The concepts, techniques and methodologies described herein may be extended to other volumes, including clones, without deviating from the scope of the disclosure.

Figure 8:
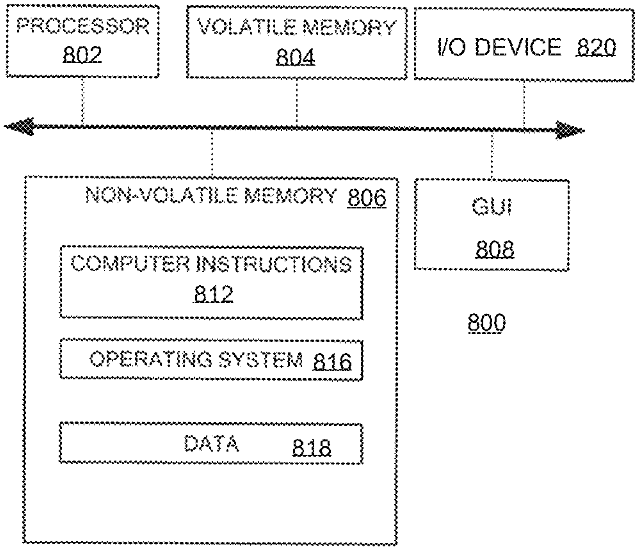
FIG. 8 is a diagram of an example of a computing device, according to one or more aspects of the present disclosure.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

In some aspects or embodiments, the term "I/O request" or simply "I/O" may be used to refer to an input or output request. In some embodiments, an I/O request may refer to a data read or write request. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refer to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:

providing a first production volume of a storage system, the first production volume associated with an object identifier and a first snapshot identifier;

generating, over time, a plurality of snapshots of the first production volume, wherein generating each snapshot includes:

associating the snapshot with an incremented object identifier associating the snapshot with an incremented object identifier, wherein the incremented object identifier is sequentially incremented from the incremented object identifier of a preceding snapshot;

associating the snapshot with the first snapshot identifier; and updating the first snapshot identifier with the incremented object identifier;

identifying one of the plurality of snapshots with which to restore the production volume based on the first snapshot identifier; and restoring the production volume using the identified one of the plurality of snapshots.

2. The method of claim 1 further comprising updating the first snapshot identifier with the incremented object identifier of the identified one of the plurality of snapshots.

3. The method of claim 1 further comprising:

generating a second snapshot of one of the plurality of snapshots;

associating the second snapshot with a next incremented object identifier; and associating the second snapshot with the incremented object identifier of the one of the plurality of snapshots.

4. The method of claim 3 further comprising restoring the production volume using the second snapshot and updating the first snapshot identifier with the next incremented object identifier of the second snapshot.

5. The method of claim 1 wherein the plurality of snapshots are point-in-time copies of the production volume.

6. The method of claim 1 wherein the plurality of snapshots are clones of the production volume.

7. The method of claim 1 wherein the first snapshot identifier identifies a closest snapshot that most nearly resembles the production volume.

8. A system comprising:

a memory; and at least one processor that is operatively coupled to the memory, the at least one processor being configured to perform operations of:

providing a first production volume of a storage system, the first production volume associated with an object identifier and a first snapshot identifier;

generating, over time, a plurality of snapshots of the first production volume, wherein generating each snapshot includes:

associating the snapshot with an incremented object identifier associating the snapshot with an incremented object identifier, wherein the incremented object identifier is sequentially incremented from the incremented object identifier of a preceding snapshot;

associating the snapshot with the first snapshot identifier; and updating the first snapshot identifier with the incremented object identifier;

identifying one of the plurality of snapshots with which to restore the production volume based on the first snapshot identifier; and restoring the production volume using the identified one of the plurality of snapshots.

9. The system of claim 8 wherein the processor is further configured to perform the operations of updating the first snapshot identifier with the incremented object identifier of the identified one of the plurality of snapshots.

10. The system of claim 8 wherein the processor is further configured to perform the operations of:

generating a second snapshot of one of the plurality of snapshots;

associating the second snapshot with a next incremented object identifier; and associating the second snapshot with the incremented object identifier of the one of the plurality of snapshots.

11. The system of claim 10 wherein the processor is further configured to perform the operations of restoring the production volume using the second snapshot and updating the first snapshot identifier with the next incremented object identifier of the second snapshot.

12. The system of claim 8 wherein the plurality of snapshots are point-in-time copies of the production volume.

13. The system of claim 8 wherein the plurality of snapshots are clones of the production volume.

14. The system of claim 8 wherein the first snapshot identifier identifies a closest snapshot that most nearly resembles the production volume.

15. A non-transitory computer-readable medium storing one or more processor-executable instructions, which, when executed by at least one processor, cause the at least one processor to perform operations of:

providing a first production volume of a storage system, the first production volume associated with an object identifier and a first snapshot identifier;

generating, over time, a plurality of snapshots of the first production volume, wherein generating each snapshot includes:

associating the snapshot with an incremented object identifier associating the snapshot with an incremented object identifier, wherein the incremented object identifier is sequentially incremented from the incremented object identifier of a preceding snapshot;

associating the snapshot with the first snapshot identifier; and updating the first snapshot identifier with the incremented object identifier;

identifying one of the plurality of snapshots with which to restore the production volume based on the first snapshot identifier; and restoring the production volume using the identified one of the plurality of snapshots.

16. The non-transitory computer-readable medium of claim 15 further comprising instructions causing the at least one processor to perform the operations of updating the first snapshot identifier with the incremented object identifier of the identified one of the plurality of snapshots.

17. The non-transitory computer-readable medium of claim 15 further comprising instructions causing the at least one processor to perform the operations of generating a second snapshot of one of the plurality of snapshots;

associating the second snapshot with a next incremented object identifier; and associating the second snapshot with the incremented object identifier of the one of the plurality of snapshots.

18. The non-transitory computer-readable medium of claim 17 further comprising instructions causing the at least one processor to perform the operations of restoring the production volume using the second snapshot and updating the first snapshot identifier with the next incremented object identifier of the second snapshot.

19. The non-transitory computer-readable medium of claim 15 wherein the plurality of snapshots are point-in-time copies of the production volume.

20. The non-transitory computer-readable medium of claim 15 wherein the plurality of snapshots are clones of the production volume.

* * * * *